United States Patent Office 3,753,896
Patented Aug. 21, 1973

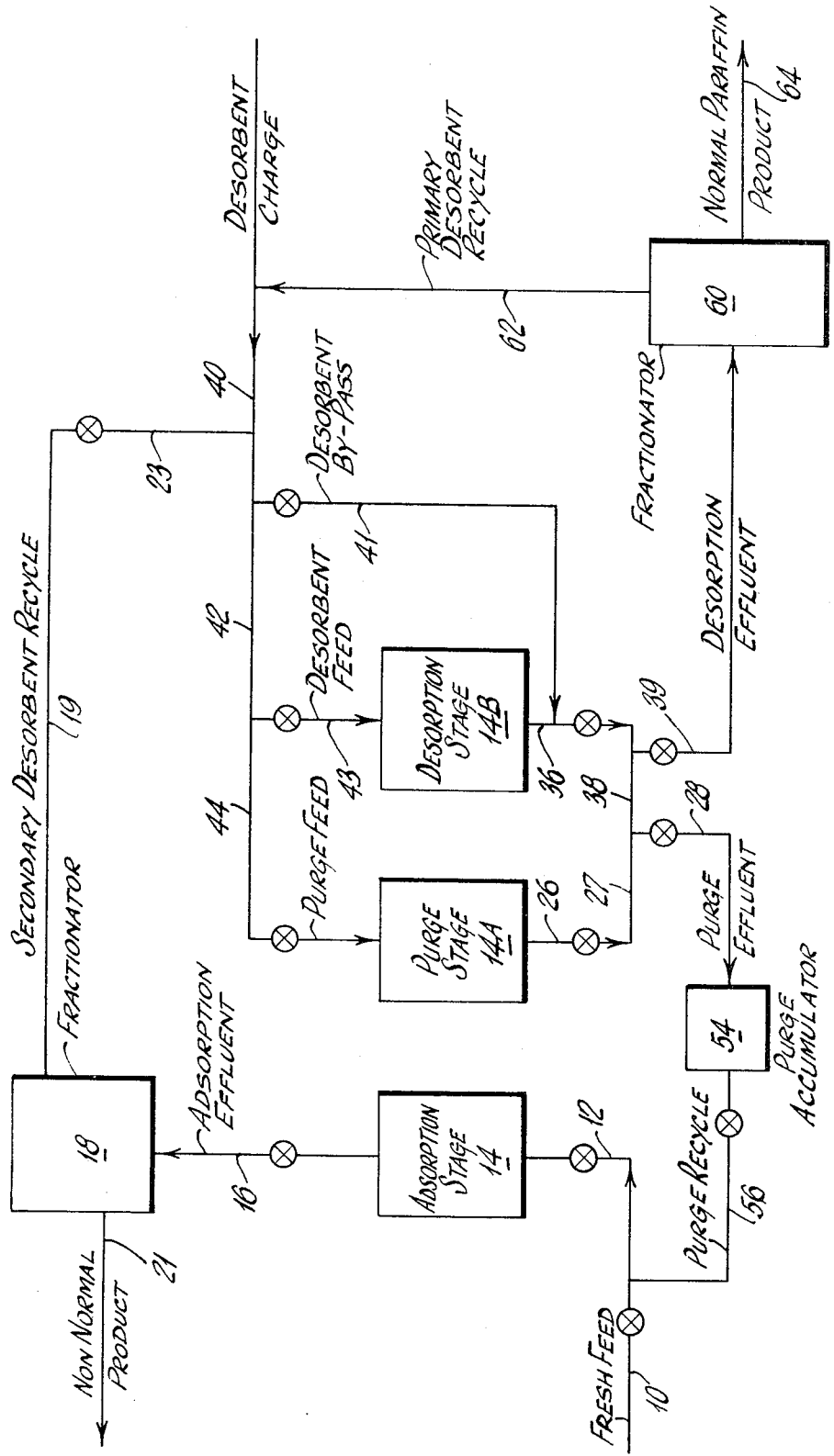

3,753,896
N-PARAFFIN ADSORPTION WITH A 20 TO 55% OVERCHARGE
William R. Bryan, and George F. de Verteuil, Pointe-a-Pierre, Trinidad and Tobago, assignors to Texaco Trinidad, Inc., Pointe-a-Pierre, Trinidad and Tobago
Filed May 20, 1971, Ser. No. 145,366
Int. Cl. C07c 7/12; C10g 25/04
U.S. Cl. 208—310
16 Claims

ABSTRACT OF THE DISCLOSURE

A multi-step vapor phase hydrocarbon separation process wherein the straight chain hydrocarbon components of a feed mixture containing said components and non-straight chain hydrocarbon components in an adsorption zone are absorbed on a molecular sieve selective adsorbent in the adsorption step, and the straight chain components in the adsorption step, and the straight chain components and subsequently removed from the selective adsorbent in a desorption step to the extent of from about 70–90% by weight of the adsorbed straight chain hydrocarbon components by a desorbing medium comprising a lighter straight chain hydrocarbon or a mixture of said lighter straight chain hydrocarbons.

The present invention relates to an improved method of separating straight chain hydrocarbons from a mixture thereof with non-straight chain hydrocarbons. More particularly, the present invention is directed to an improved vapor phase method of separating relatively long straight chain hydrocarbons from hydrocarbon mixtures at elevated temperatures and superatmospheric pressures using a molecular sieve selective adsorbent of Type 5A structure.

It is known from commonly assigned U.S. Pat. No. 3,373,103 that $C_{10}$–$C_{20}$ straight chain hydrocarbons can be separated from vapor phase mixtures thereof with non-straight chain hydrocarbons by a method comprising the steps of adsorption, purge and desorption carried out at elevated temperatures.

It has now been found that this method can be considerably improved by the method of the present invention.

The improved method of the present invention broadly comprises in combination an adsorption step, a depressurization step, a purge step, a repressurization step, and a desorption step. More specifically, the method of the present invention comprises an adsorption step wherein at an elevated temperature and preferably at a superatmospheric pressure a vapor phase mixture of straight chain and non-straight chain including cyclic hydrocarbons is contacted with a molecular sieve selective adsorbent to adsorb the straight chain hydrocarbon components of the mixture therefrom in the pores of said adsorbent; the adsorption step is terminated when the adsorption zone contains a straight chain hydrocarbon overchange of from about 20% to 55% by weight therein; a depressuring step wherein the pressure of the adsorption step is reduced to a value below that employed in the adsorption step; the depressuring step is discontinued; a purge step wherein the laden adsorbent is contacted with a straight chain hydrocarbon in vapor phase to remove surface-adsorbed hydrocarbons and hydrocarbons in the void spaces of the bed therefrom at a prescribed space velocity repressuring step wherein the pressure inside the adsorp- and purge volume ratio; the purge step is discontinued; a tion vessel is increased to a value greater than the pressure of the purge step; repressurization is terminated; a desorption step wherein the adsorbed straight chain hydrocarbons from the selective adsorbent are desorbed in the vapor phase with a straight chain hydrocarbon having a molecular weight less than the molecular weight of the lightest straight chain hydrocarbon component of the adsorbed hydrocarbons; the desorption step is terminated; and repeating said operation in sequence.

The expression "surface-adsorbed hydrocarbons" as used hereinabove includes all adsorption on the sieve other than in the sieve cages (within the zeolite crystal). The expression includes all the non-normal compounds adsorbed in the macro-pores of the sieve (inter-crystalline pores) as well as those adsorbed on the surface.

The method of the present invention is particularly adaptable for the production of high purity normal paraffins in excellent yields in a rapid, efficient and economical manner.

Accordingly, it is an object of the present invention to provide an improved hydrocarbon treating process. A further object is to provide an improved method of producing relatively high molecular weight straight chain hydrocarbons of a high degree of purity in commercially attractive yields from mixtures of such hydrocarbons and non-straight chain hydrocarbons. A still further object is to provide an improved cyclic hydrocarbon separation process which is conducted in a relatively short period of time.

How these and other objects of this invention are accomplished will become apparent with reference to the accompanying disclosure. In at least one embodiment of the invention at least one of the foregoing objects will be achieved.

By "straight chain" hydrocarbon is meant any aliphatic or acyclic or open chain hydrocarbon which does not possess side chain branching. Representative straight chain hydrocarbons are the normal paraffis and the normal olefins, mono- or polyolefins, including the straight chain acetylenic hydrocarbons. The "non-straight chain" hydrocarbons comprise the aromatic and naphthenic hydrocarbons as well as the isoparaffinic, isoolefinic hydrocarbons and the like.

Straight chain hydrocarbon-containing mixtures which are suitably treated for the separation of straight chain hydrocarbons therefrom include the various petroleum fractions such as naphtha or a gasoline fraction, a diesel oil fraction, a kerosene fraction, a gas oil fraction and the like. A typical hydrocarbon fraction which may be treated for the removal of straight chain hydrocarbons therefrom might have a boiling point or boiling range in the range 40–600° F. and higher and contain a substantial amount of straight chain hydrocarbons, e.g. 2–35% by volume and higher. More particularly, a hydrocarbon fraction to be treated and containing straight chain hydrocarbons might have an initial boiling point in the range 40–300° F. and an end point in the range of 150–600° F. and higher. A hydrocarbon fraction treated for the removal of straight chain hydrocarbons therefrom might have the following composition:

| Hydrocarbon type: | Percent by vol. |
|---|---|
| Naphthenes | 0–75 |
| Aromatics | 0–50 |
| Acyclic saturates and unsaturates (including normal paraffins, isoparaffins, normal olefins and/or isoolefins) | 2–90 |

Typical refinery stocks or petroleum fractions which may be treated for the adsorptive separation of straight chain hydrocarbons therefrom are a wide boiling straight run naphtha, a heavy straight run naphtha, a light straight run naphtha, a catalytic cracked naphtha, a thermally cracked naphtha and the like, or a hydrotreated naphtha or diesel oil or kerosene or gas oil fraction including mixtures thereof.

The practice of this invention is applicable to any solid selective adsorbent which selectively adsorbs straight chain hydrocarbons to the substantial exclusion of non-straight chain hydrocarbons. This invention, however, is particularly applicable to a molecular sieve selective adsorbent comprising certain natural or synthetic zeolites or aluminosilicates, such as a calcium aluminosilicate, which exhibits the property of a molecular sieve, that is matter made up of porous crystals wherein the pores of the crystals are of molecular dimension and are of substantial uniform size. In general, zeolites may be described as waste-containing aluminosilicates having a general formula

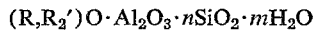
$$(R,R_2')O \cdot Al_2O_3 \cdot nSiO_2 \cdot mH_2O$$

wherein R may be in alkaline earth metal such as calcium, strontinum or barium or even magnesium and wherein R' is an alkali metal such as sodium or potassium or lithium. Generally, these materials when dehydrated for the removal of substantially all of the water therefrom, retain their crystalline structure and are particularly suitable as selective adsorbents.

A particularly suitable solid adsorbent for straight chain hydrocarbons is a calcium aluminosilicate, apparently actually a sodium calcium aluminosilicate, marketed by Linde Company, and designated Linde Molecular Sieve Type 5A or 5A–XW. The crystals of this particular calcium aluminosilicate have a pore size or opening of about 5 A. units, a pore size sufficiently large to admit straight chain hydrocarbons, such as the normal paraffins and the normal olefins, to the substantial exclusion of the non-straight chain hydrocarbons, i.e. naphthenic, aromatic, isoparaffinic and isoolefinic hydrocarbons. This particular selective adsorbent is available in various sizes, such as in the form of ⅛" or 1/16" diameter extrusions, or as a finely divided powder having a particle size in the range of 0.5–5.0 microns. In general, a selective adsorbent employed in the practice of this invention may be in any suitable form or shape, granular spheroidal or microspheroidal.

The method of the present invention should be carried out in the vapor phase and under substantially isothermal conditions. The particular operating conditions selected are dependent on the nature of the feed stream to the adsorption zone, the carbon number range of the feed stream and desired product stream as well as the carbon number distribution (relative amounts of each carbon number) within the range, the straight chain hydrocarbon content of the feed stream and the olefinic, sulfur, nitrogen and aromatic compounds content thereof. In general, the feed stream preferably should be relatively low in olefins, sulfur, nitrogen and aromatics content and these impurities can be readily reduced to acceptable limits or removed in a manner well known in the art such as by mild hydrogenation involving mild catalytic reforming. In addition, the feed stream should be relatively free from the lower molecular weight hydrocarbons such as in the range from about $C_1$–$C_6$ as such light hydrocarbons complicate recovery of the desorbing medium.

In the accompanying drawing the single figure thereof illustrates a schematic flow diagram of one method of carrying out the present invention.

In the drawing a vapor phase mixture of relatively high molecular weight straight chain and non-straight chain hydrocarbons is charged by way of lines 10 and 12 into a lower end of an adsorption vessel 14 maintained at an elevated temperature and superatmospheric pressure containing a bed of synthetic calcium sodium aluminosilicate of Type 5 A. structure such as a Linde 5A–XW Sieve therein. In the adsorption vessel 14 the straight chain components of the feed mixture are adsorbed by the selective adsorbent. From the outlet end of the vessel 14 through line 16 there is recovered a treated effluent mixture now containing a substantially reduced amount of straight chain hydrocarbons therein as well as desorbing medium present in the sieve cages from a previous desorption step and the effluent is passed to a fractionator 18 from which is recovered a non-straight chain hydrocarbon product stream by way of line 21 which can be passed to a storage vessel, not shown, for use as a fuel source and a desorbent recycle stream by way of line 19 which can be returned to desorption feed line 40 by way of line 23. The desorbent medium present in the adsorption effluent is obtained from the previous cycle wherein during desorption, a portion of the desorbing medium is adsorbed by the sieve pores from which the higher molecular weight straight chain components have been removed.

At the completion of the adsorption step, hereinafter more fully described, the feed in line 10 to adsorption vessel 14 is discontinued. In the depressuring step, the vessel 14A is depressured by venting through lines 26, 27, 28 and accumulator 54 maintained at about atmospheric pressure. When vessel 14A is at the selected low pressure in the depressuring step, the purge step is begun. In the purging step, a stream of desorbing gas feed contained in lines 40, 42 and 44 is introduced countercurrent to the flow of the feed stream 10 into vessel 14A at a prescribed space velocity and purge volume ratio and a purge effluent stream is withdrawn therefrom by way of lines 26, 27 and 28 and passed to purge accumulator 54. At the end of the purge step the repressuring step is commenced.

In the repressuring step, the flow of the stream of desorbing gas into vessel 14A by way of line 44 was continued to increase the pressure in the vessel to the selected desorbing pressure. When the selected desorbing pressure is attained in vessel 14A the desorption step is begun.

In the desorption step, the desorbing medium in the vapor state is passed through lines 40, 42 and 43 into the adsorbent vessel 14B containing the straight chain hydrocarbon components adsorbed by the selective adsorbent. The flow of the desorbing gas is also countercurrent to the feed flow during the adsorption step.

Countercurrent desorption flow (i.e. opposite to the flow in the vessel during adsorption) is highly desirable to assist in removing adsorbed straight chain hydrocarbons from the selective adsorbent.

The resulting desorption effluent is withdrawn from vessel 14B by way of line 36 and passed through lines 38 and 39 to fractionator 60 wherein the desorbate and desorbing gas are separately recovered. The adsorbed straight chain hydrocarbons in the desorbate are recovered from fractionator 60 by way of line 64. The desorbing medium is recovered by way of line 62 and can be returned to line 40 for further use.

At the termination of the desorption step, vessel 14B is depressured to attain the lower pressure used in the adsorption step and the cycle is repeated by introducing an additional quantity of fresh feed into vessel 14 by way of line 10 and line 12.

The adsorption step in the process of the present invention is carried out with the feed stream being in the vapor phase.

The particular adsorption temperature used varies with the type of charge stock, carbon number content thereof, and desired range of the straight chain hydrocarbons to be recovered from the charge stock. However, it is necessary to carry out the adsorption step at a temperature above the dew point of the vaporized feed stream to minimize surface adsorption of the non-adsorbed hydrocarbons on the selective adsorbent and also to decrease the holdup of the charge stock in the sieve voids. A further requirement, which controls the upper temperature limit of the adsorption step is the need to avoid cracking of the charge stock. Keeping in mind these lower and upper temperature limitations, it has been found that a temperature range of about 575–675° F. in the adsorption step will permit excellent separations.

In the adsorption step, the adsorption vessel should be maintained at a positive pressure above atmospheric pressure to permit the selective adsorbent to adsorb an additional quantity of normal straight chain by hydrocarbons in the adsorption step. It has been found that maintaining the adsorption vessel at a pressure of between 10 and 50 p.s.i.g. during the adsorption step affords good results in terms of rapid adsorption of the adsorbable components of the feed stream by the selective adsorbent.

The charge stock is introduced into the adsorption vessel at a selected rate and the feed is continued until the selective adsorbent is loaded with normal straight chain componentes of the feed. In troduction of feed in continued beyond the point at which the straight chain components of the feed being to "breakthrough" into the adsorption effluent (nonadsorbed portion of the feed). Introduction of the feed into the adsorption vessel is terminated when there is a "straight chain hydrocarbon overcharge" of between about 20 up to about 55 weight percent therein. By increasing the "straight chain hydrocarbon overcharge" to the adsorption vessel to a range of from about 20 up to about 55%, preferably from 25 to 35%, one is able to obtain increased sieve capacity in a given cycle time with a resultant increase in quantity of the desired straight hydrocarbon product per cycle.

"Straight chain hydrocarbon overcharge" is defined as the amount of straight chain hydrocarbons in the fresh feed stock to the adsorption vessel which is charged during the adsorption step in excess of the total amount on a weight basis of recovered straight chain hydrocarbon during desorption and the straight chain hydrocarbon recovered in the depressuring and purge effluent streams. The utilization of the selective adsorbent at maximum efficiency is a material factor in the process of the present invention because it compensates for the less than complete desorption of the adsorbed straight chain hydrocarbons in the subsequent desorption step.

After termination of the adsorption step the adsorption vessel is depressured in a depressuring step to a lower pressure than the adsorption pressure. This depressuring step is required to remove some of the surface adsorbed nonnormal straight chain hydrocarbons from the selective adsorbent and to also begin to remove from the adsorption vessel, particularly from the void spaces between the selective adsorbent some of the unadsorbed portion of the charge stock while minimizing loss of the adsorbed straight chain hydrocarbons from the sieve pores.

The depressuring step is terminated when the adsorption pressure is decreased to about atmospheric pressure, and advantageously in the range of 0–10 p.s.i.g. The depressuring step is carried out at substantially the same temperature as was used in the adsorption step.

Following termination of the depressuring step, a purge step is begun using as the purge medium a vaporized slip-stream of the same material subsequently used as the desorbing medium. The purge step is carried out at substantially the same temperature as the adsorption and depressuring steps, and at the reduced pressure attained in the depressuring step. In this purge step a stream of the vaporized desorption medium is introduced into the adsorption vessel in a direction countercurrent to the flow of the charge stock thereto. The purge medium removes the remaining portion of the charge stock from the adsorption vessel and the surface adsorbed non-straight chain components from the selective adsorbent. In the purge step it is necessary to maintain the purge medium in the vapor state for efficient operation and the flow rate thereof at a value between 50 and 1000 vapor hourly space velocity (volume of vapor per hour per volume of adsorbent) and the purge medium volume at a value between 0.1 and 10 volumes and wherein the ratio of the purge medium rate to the purge medium volume is between 40 and 7000 to minimize removal of the pore adsorbed straight chain components of the feed stream and to maximize removal of surface-adsorbed and the bed-entrapped contaminating components. The term "purge volume" refers to the amount of purge medium in the purge effluent stream per cycle and is equivalent to one vapor volume displacement (at purge conditions) of the total volume occupied by the sieve bed. Most efficient operations are conducted using a purge medium velocity of 170 to 680 VHSV and a purge medium volume of 0.2 to 6.0, when it is desired to attain exceptionally high n-paraffin product purity. The effluent from the purge step comprising purge medium, unadsorbed charge stock and surface adsorbed components of the charge stock together with some adsorbed n-paraffins removed from the sieve pores by the purge gas is returned to the fresh feed line as a supplemental charge to the adsorption vessel. Routing of the purge effluent in this manner permits readsorption by the sieve of the normal straight chain hydrocarbon components of the feed that had been removed therefrom in the purge step. In addition the normal paraffins in the purge stream effluent are not lost to the process.

After completion of the purge step, the vessel is repressured to the desorption pressure which is advantageously about 20–75 p.s.i.g., and preferably about 1–20 p.s.i.g. above the highest pressure in the sieve vessel during the adsorption step. This repressuring step is necessary to permit more rapid desorption of the pore adsorbed straight chain components from the adsorbent and to facilitate removal of these components from the sieve by the desorbing medium in the desorption step. The desorption pressure is attained by discontinuing the flow of the purge effluent stream to the purge accumulator via line 28, while continuing the flow of purge gas into the adsorption vessel. The rate of flow of the desorbing gas into the adsorption vessel is about 0.25–3 LHSV to remove the pore adsorbed straight chain hydrocarbons from the sieve. The desorption effluent comprising a mixture of desorbed straight chain hydrocarbons and desorbing medium is recovered from the adsorption vessel and then treated to separately recover the desorbing medium and the desorbed straight chain hydrocarbons.

In the desorbing step, the desorbing medium employed is essentially of the same composition as the purge medium. Use of the same hydrocarbon composition as the purge and desorption media avoids the problem of product contamination with other hydrocarbons while simplifying the processing requirements. Choice of a suitable desorption medium for use in the practice of the present invention is largely dependent on the composition of the fresh feed, avails thereof and desired end product carbon number distribution. In general, it has been found that most advantageous results are obtained when the desorption medium has a composition comprising a major amount of a straight chain hydrocarbon or a mixture of straight chain hydrocarbons having an average of about 1 to 3 carbon atoms less than the lightest straight chain hydrocarbon in the fresh feed charge to the adsorption vessel. Maintaining a carbon number spread of about 1 to 3 between the purge-desorption media and the fresh feed charge lightest component permits effective and rapid desorption times in the process of the present invention in addition to affording ease of separation of the desorbing medium from the desired product stream by fractionation. Advantageously in the treatment of $C_{10}$–$C_{15}$ charge stocks, a purge-desorption medium comprising about 80% by weight of normal heptane has been found to be satisfactory. In processing heavier stocks, e.g. $C_{14}$–$C_{20}$ containing stocks, a desorption medium composed of $C_{10}$–$C_{12}$ straight chain components has been found to give excellent results.

In the prior processes, the desorption step is generally the limiting factor in overall process time because of the amount of time required to effect removal of the adsorbed components from the sieve pores. The present process provides a means of shortening the desorption time period of prior processes by the combination of (a) using a desorbing medium in the vapor state and comprising in itself an adsorbable normal paraffin hydrocarbon and/or admixture of such normal paraffin hydrocarbons, (b) a desorption medium space velocity of 0.25 to 3 LHSV, and (c) additionally in terminating the desorption step when about 10–30% by weight of the pore adsorbed straight chain hydrocarbon components remain in the sieve pores. Such a desorbing combination will materially improve the desorption of the adsorbed straight chain components from the sieve pores. It has been found that a desorption temperature of about 600° F. employing a n-heptane desorption medium in the desorption of $n$-$C_{10}$–$C_{15}$ components from the adsorbent pores at a desorption medium space velocity in the range of about 0.5–1.5 LHSV, volumes of liquid desorbent/hour/volume of adsorbent, the adsorbed components can be removed to the extent of 89–90% in from about 10–17 minutes; at a 0.5 LHSV in from about 17 to 26 minutes.

In the desorption step of the present invention, the flow of desorbing medium into the adsorption zone is countercurrent to the fresh feed charge which preferably is upflow. By operating in this manner the lighter straight chain hydrocarbon components of the charge adsorbed in the pores of the adsorbent during the adsorption step are first desorbed, and, in turn, they assist the desorbing medium in desorbing of the adsorbed heavier straight chain hydrocarbon components nearer to the desorption outlet end of the vessel. Termination of the desorption cycle short of essentially complete removal of adsorbed straight chain hydrocarbons from the sieve pores permits the time of desorption to be materially decreased, i.e. in the order of 25–80%.

At the termination of the desorption step, the adsorption vessel is depressured to the adsorption pressure and the cyclic operation is repeated.

While the above detailed description of the process of the present invention has referred to a single vessel operation for simplicity, it is within the purview of the invention to produce same on a multi-vessel basis, wherein one or more separate vessels are used in each of the main process steps, i.e. adsorption, purge and desorption while another set of vessels are on a regeneration cycle. Periodic regeneration of the selective adsorbent is needed to restore the activity thereof after use in the process for an extended processing period. Suitable regeneration techniques known in the art such as, for example, the process disclosed in the Carter et al. U.S. Pat. 2,908,639 can be used.

The process of the present invention is essentially a timed cyclic process. It has been found that satisfactory results have been achieved if the adsorption step is accomplished in about one-third of the total processing time, the remaining two-thirds being taken up by the balance of the processing steps, e.g. depressure, purge, repressure, desorption and repressure. In general, in processing kerosene type charge stocks to recover the straight chain hydrocarbon components thereof it has been found that the following time sequence is advantageous: adsorption, 7;18 min.; depressure, 0.50 min.; purge .75 min.; repressure, 0.50 min.; desorption 13–34 min.; a total cycle time of 22–54 minutes, approximately. In the desorption step of the present invention, it is particularly advantageous to carry out these steps in the following manner:

In the adsorption step, the valves in lines 26, 36, 41, 43 and 44 are in the closed position. At the termination of the adsorption step the valve in line 41 opens and permits the desorbing medium maintained in the lines 40 and 41 under pressure and at elevated temperature, to be by-passed around the adsorption vessel. At the same time the valve in line 26 is opened to decrease the pressure in the adsorption vessel 14A (on the purge cycle). Then the valve in line 44 is opened to permit passage of a stream of desorbing medium into vessel 14A for the purging step. At the completion of the purging step, the vessel is repressured by the flow of the stream of desorbing medium into the vessel until the desorption pressure is reached. The valves in lines 41 and 44 are then closed and the valves in lines 43 and 36 are opened substantially simultaneously with the closing of valves in lines 41 and 44. At the conclusion of the desorption step the valves in lines 43 and 36 are closed. Operating with this valve switching sequence permits the yield of high purity normal paraffins to be increased without damaging the sieve bed by pressure variations during this portion of the cycle. This embodiment further permits use of low purge volume displacements during the purge step and minimizes the loss of adsorbed normal paraffins from the sieve pores during the purge cycle.

In carrying out the process of the present invention it has been found advantageous to employ a three sieve case system wherein one sieve case is on the adsorption cycle and the remaining two cases are on the desorption cycle (i.e. includes the depressure, purge, repressure and desorption steps). Operating with two cases on the desorption cycle permits a lower desorbing medium space velocity to be employed since the available desorption time is lengthened for a given total cycle time. The beneficial results obtained by operation in this manner include increased sieve utilization at a given desorption rate or lower desorption medium requirements at the same desorption rate. It is necessary to carry out desorption of the two sieve cases on the desorption cycle in parallel to prevent readsorption of the desorbed normal paraffins at the inlet of the second sieve case. Series desorption in the sieve cases is to be avoided for this reason.

COMPARATIVE EXAMPLE A

A hydrotreated kerosene fraction having a boiling point range of 257 to 460° F. and containing about 27% by weight of $C_{10}$–$C_{16}$ straight chain hydrocarbons was charged at a temperature of 600° F. and a pressure of about 25 p.s.i.g., together with a purge recycle stream comprising 40% $C_{10}$–$C_{16}$ straight chain hydrocarbons and 18% of purge medium to the lower end of an adsorption vessel measuring 22 feet by 8 feet in diameter, having an internal volume of about 1,100 cubic feet and containing about 55,000 pounds of 1/16 inch extruded molecular sieve selective adsorbent, sold under the tradename Linde 5A–XW Molecular Sieve, at a combined feed charge rate of 60,000 lbs. per hour. There was recovered from the other end of the vessel an adsorption effluent stream at a rate of about 60,000 lbs. per hour. In the adsorption vessel, the selective adsorbent adsorbed the straight chain hydrocarbon components of the feed until a total time of 7½ minutes had elapsed at which time there was a 8.3% overcharge of straight chain hydrocarbons. The feed into the adsorption vessel was then discontinued and the vessel depressured to a pressure of 0 p.s.i.g., in ½ minute. After attaining the purge pressure, a stream of the desorbing medium in the vapor state and comprising 84% by weight of $C_5$–$C_8$ straight chain hydrocarbons (82% n-heptane), balance $C_5$–$C_8$ non-straight chain hydrocarbon compounds, was passed into the adsorption vessel at a rate of 25,000 lbs. per hour and countercurrent to the direction of charge stock thereto. The purge effluent comprising 40% surface absorbed material, 18% purge medium, and 42% of adsorbed straight chain hydrocarbons removed from the pores of the adsorbent, was removed at a rate of about 25,000 lbs./hr., passed through a cooler-accumulator to reduce the temperature and pressure of the effluent to a value of about 120° F. and 0 p.s.i.g. and then introduced into the fresh feed line for return to the adsorption vessel on the next adsorption cycle.

After a purge period of about 55 seconds, the flow of purge effluent from the adsorption zone was discontinued. The desorbing medium, having the same composition as the purge medium described hereinabove was passed into the adsorption vessel in the same direction as the purge medium (counter-current to the feed on adsorption cycle) at a rate of 32,000 lbs. per hour to repressure the vessel to the desorption pressure of about 35 p.s.i.g. The repressuring operation was completed after about ½ minute. There was recovered a desorption effluent which on subsequent separation yielded a $C_{10}$-$C_{16}$ straight chain hydrocarbon fraction, and a desorbing medium fraction. The separated desorbing medium was reused in the next sequence.

The flow of desorption medium to the adsorption vessel was discontinued when approximately 70% of the pore adsorbed straight chain hydrocarbon components had been removed from the sive pores The desorption time was 13.1 minutes. The vessel was switched to the adsorption step and the processing sequence was repeated.

EXAMPLES I, II AND III

The procedure of comparative Example A was repeated except that the adsorption cycle is extended for 10, 14 and 18 minutes respectively to provide an overcharge of 23.3%, 42.8% and 55.6% respectively, in the adsorption zone in these examples. Data from the results of these examples are set forth.

TABLE.—SUMMARY OF TEST RESULTS

| Example number | A | I | II | III |
|---|---|---|---|---|
| Adsorption time, minutes | 7.5 | 10 | 14 | 18 |
| Adsorptive capacity, percent | 3.50 | 3.97 | 4.18 | 4.20 |
| Percent overcharge | 8.3 | 23.3 | 42.8 | 55.6 |

From the data in the above table it is evident that during the adsorption step by overcharging the adsorption zone to the extent of from about 20 to 55% of straight chain hydrocarbon components of the fresh feed, one is able to obtain a higher loading of straight chain hydrocarbons on the sieve and thereby increase its adsorptive capacity.

The straight chain hydrocarbon overcharge range to the adsorption vessel can be attained by increasing the space velocity of the feed thereto and/or by increasing the straight chain hydrocarbon content of the feed.

Obviously, many modifications and variations of the invention as hereinbefore set forth may be made without departing from the spirit and scope thereof and therefore only such limitations should be made as are indicated in the appended claims.

We claim:

1. An improved process for the preparation of a $C_{10}$-$C_{20}$ straight chain hydrocarbon product stream which comprises in combination introducing a vapor phase mixture of $C_{10}$-$C_{20}$ straight chain and non-straight chain hydrocarbons into an adsorption zone at an elevated temperature and superatmospheric pressure to effect adsorption of the straight chain hydrocarbon components by the molecular sieve selective adsorbent of Type 5A structure in said adsorption zone, withdrawing from the adsorption zone an adsorption effluent comprising the non-straight chain hydrocarbon components of the resultant treated mixture, terminating the adsorption step when said selective adsorbent is loaded with the straight chain hydrocarbon components of the feed and the adsorption zone contains a straight chain hydrocarbon overcharge of from about 20 to about 55% by weight, depressuring the adsorption zone in a depressuring step to reduce the pressure therein to a pressure less than the pressure of the adsorption zone, discontinuing the depressuring step, in a purge step introducing a purge stream of a desorbing medium comprising a major portion of straight chain hydrocarbons having a lower molecular weight than the lightest component of the charge admixture into the depressured adsorption zone to remove surface adsorbed components of the charge therefrom, continuing said purge stream flow until the total volume of the adsorption zone is displaced with between 0.1 and 10 purge volumes, terminating the purge step, repressuring the adsorption zone to a pressure greater than the said adsorption pressure, terminating the repressuring step, in a desorption step introducing in the gaseous state at a space velocity in the range of 0.25 and 3 LHSV a desorbing medium having the same composition as the purge medium to effect removal of the adsorbed straight chain hydrocarbons from the selective adsorbent, recovering a desorption effluent therefrom, separating the straight chain hydrocarbons as a product stream from said desorption effluent, terminating the desorption step when between 70 and 90% by weight of the adsorbed hydrocarbons in the pores of the selective adsorbent have been removed by the desorbing medium, and repeating the cycle sequentially.

2. Process as claimed in claim 1 wherein the adsorption and the desorption temperatures are in the range of from about 575–675° F., the adsorption pressure is in the range of from 10–50 p.s.i.g. and the desorption pressure is at least 1 to 25 pounds higher than the highest pressure in the sieve vessel during the adsorption step.

3. Process as claimed in claim 1 wherein the feed to the adsorption zone comprises an admixture of $C_{13}$-$C_{20}$ hydrocarbons and the purge-desorbing medium comprises a major amount of normal heptane.

4. Process as claimed in claim 1 wherein the feed to the adsorption zone comprises an admixture of $C_{13}$-$C_{20}$ hydrocarbons and the purge-desorbing medium comprises a major amount of at least one straight chain hydrocarbon selected from the group consisting of the $C_{10}$-$C_{12}$ hydrocarbons and mixtures thereof.

5. Process as claimed in claim 1 wherein the pressure during the purge step is about atmospheric pressure.

6. Process as claimed in claim 1 wherein the adsorption zone straight chain hydrocarbon overcharge is about 25%.

7. Process as claimed in claim 1 wherein the flow of the purge medium is between 0.2 and 6 purge volumes.

8. Process as claimed in claim 1 wherein the space velocity of the desorbing medium is in the range of about 0.5 and 2.0 LHSV.

9. A process for the separation of $C_{10}$-$C_{20}$ straight chain hydrocarbons or a fraction thereof from an admixture containing said straight chain hydrocarbons and non-straight chain hydrocarbons which comprises introducing said admixture in the vapor state into an adsorption zone maintained at a temperature of about 600–670° F., and a pressure of about 10–50 p.s.i.g. and containing a synthetic crystalline molecular sieve selective adsorbent of Type 5A structure having adsorbed thereon lighter straight chain hydrocarbon desorbing medium from a later step in the process to effect adsorption of the straight chain hydrocarbon components of the admixture by said selective adsorbent, withdrawing from said adsorption zone as an adsorption effluent the resulting admixture now containing a reduced amount of said straight chain hydrocarbons together with said lighter straight chain hydrocarbons desorbed from said selective adsorbent during adsorption, discontinuing the introduction of said vaporized mixture to said adsorption zone when the said selective adsorbent is substantially saturated with said $C_{10}$-$C_{20}$ straight chain hydrocarbons and said adsorption zone contains a straight chain hydrocarbon overcharge of from about 20 to 35% by weight, depressuring said adsorption zone to a pressure less than the adsorption pressure and in the range of about 0 to 10 p.s.i.g. while maintaining the temperature at about the adsorption temperature, introducing a gaseous purge medium comprising a major amount of straight chain hydrocarbons having about 1 to 3 carbon atoms less than the lightest component of the fresh feed to the adsorption zone into said depressured adsorption zone in a direction countercurrent to the direction of flow of said charge admixture and displacing the total volume of the adsorption zone with between 0.1 and 10 purge volumes to remove surface adsorbed hydrocarbons from said selective adsorbent, withdrawing from the adsorption zone a gaseous purge effluent stream comprising said surface adsorbed hydrocarbons, and some of the adsorbed $C_{10}$-$C_{20}$ straight chain hydrocarbon components of the admixture and said lighter straight chain hydrocarbon purge medium, admixing said withdrawn purge effluent stream with said admixture being introduced into the adsorption zone during the adsorption step, repressuring the adsorption zone to an elevated pressure which is in the range of 1 to 25 pounds above the highest pressure in the adsorption vessel during the adsorption step, introducing at a space velocity in the range of 0.25 and 3 LHSV a desorbing medium stream comprising a major portion of straight chain hydrocarbons having about 1 to 3 carbon atoms less than the lightest component of the fresh feed to the adsorption zone into the repressured adsorption zone to remove from about 70 to about 90% by weight of the adsorbed $C_{10}$–$C_{20}$ straight chain hydrocarbons from said selective adsorbent and concomitantly adsorbing some of the lighter straight chain components of the desorbing medium into said selective adsorbent, withdrawing from said adsorption zone a gaseous desorption effluent stream comprising desorbed straight chain hydrocarbons and said desorbing medium, separating said desorption effluent into a $C_{10}$–$C_{20}$ straight chain hydrocarbon product and said desorption medium, depressuring the adsorption zone until the pressure is at the aforesaid adsorption pressure and repeating said adsorption step.

10. Process as claimed in claim 9 wherein the time for said adsorption step is about one-third of the total cycle time.

11. Process as claimed in claim 9 wherein said admixture comprises $C_{13}$–$C_{20}$ straight chain and non-straight chain hydrocarbons and wherein said desorbing medium comprises at least about 80% by weight of at least one straight chain hydrocarbon selected from the group consisting of the $C_{10}$–$C_{12}$ hydrocarbons and mixtures thereof.

12. Process as claimed in claim 9 wherein said admixture comprises $C_{13}$–$C_{20}$ straight chain and non-straight chain hydrocarbons and wherein said desorbing medium comprises at least about 80% by weight of normal straight chain $C_7$ hydrocarbons.

13. Process as claimed in claim 9 wherein the adsorption effluent comprising the admixture now containing a reduced amount of said straight chain hydrocarbons and said lighter straight chain hydrocarbons desorbed from said selective adsorbent is fractionated, said lighter straight chain hydrocarbons are recovered and used as a portion of the desorbing medium during the desorption step.

14. Process as claimed in claim 9 wherein the flow of the purge medium is between 0.2 and 6 purge volumes.

15. Process as claimed in claim 9 wherein the adsorption zone straight chain hydrocarbon overcharge is about 25%.

16. Process as claimed in claim 9 wherein the space velocity of the desorbing medium is in the range of about 0.5 and 2.0 LHSV.

References Cited
UNITED STATES PATENTS

| | | | |
|---|---|---|---|
| 3,520,801 | 7/1970 | Lewis et al. | 208—310 |
| 3,373,103 | 3/1968 | Cooper et al. | 208—310 |
| 3,231,631 | 1/1966 | Hicks et al. | 208—310 |

HERBERT LEVINE, Primary Examiner

U.S. Cl. X.R.

260—676 MS

PO-1050
(5/69)

UNITED STATES PATENT OFFICE
CERTIFICATE OF CORRECTION

Patent No. 3,753,896      Dated August 21, 1973

Inventor(s) William R. Bryan and George F. de Verteuil

It is certified that error appears in the above-identified patent and that said Letters Patent are hereby corrected as shown below:

| | |
|---|---|
| Col. 1, lines 65 & 66 | Should be reversed. |
| Col. 2, line 32 | "paraffis" should be spelled --paraffins-- |
| Col. 2, line 67 | After the last word "cracked" the following words were left out --or thermally reformed naphtha, a catalytic reformed-- |
| Col. 3, line 14 | "in" should be --an-- |
| Line 15 | "strontinum" should be spelled --strontium-- |
| Col. 4, line 74 | Delete the word "by" |
| Col. 5, line 8 | "componentes" should be spelled --components-- |
| line 8 | "In troduction" should be --Introduction-- |
| line 8 | "in" should be --is-- |
| Line 10 | "being" should be --begin-- |
| line 25 | "hydrocarbon" should be --hydrocarbons-- |
| line 26 | "hydrocarbon" should be --hydrocarbons-- |
| Col. 7, line 55 | "7;18 min" should be --7-18 min.-- |
| line 58 | This sentence should start a new paragraph. |
| Col. 9, line 9 | "sive" should be --sieve-- |

Signed and sealed this 23rd day of April 1974.

(SEAL)
Attest:

EDWARD M. FLETCHER, JR.
Attesting Officer

C. MARSHALL DANN
Commissioner of Patents